(12) United States Patent
Witters

(10) Patent No.: US 8,373,302 B1
(45) Date of Patent: Feb. 12, 2013

(54) RENEWABLE POWER TRANSMISSION OVERLAY

(75) Inventor: Allen L. Witters, Las Vegas, NM (US)

(73) Assignees: Allen L. Witters, Dallas, TX (US); Joel Scheinberg, Las Vegas, NM (US); Robert E. Lyon, Los Angeles, CA (US)

(*) Notice: Subject to any disclaimer, the term of this patent is extended or adjusted under 35 U.S.C. 154(b) by 206 days.

(21) Appl. No.: 12/351,716

(22) Filed: Jan. 9, 2009

Related U.S. Application Data

(60) Provisional application No. 61/020,096, filed on Jan. 9, 2008.

(51) Int. Cl.
*H02J 3/38* (2006.01)
(52) U.S. Cl. .................. 307/23; 307/18; 307/25; 307/84
(58) Field of Classification Search .................... 307/18, 307/23, 25, 84
See application file for complete search history.

(56) References Cited

U.S. PATENT DOCUMENTS

2003/0102675 A1* 6/2003 Noethlichs ..................... 290/44

\* cited by examiner

*Primary Examiner* — Hal Kaplan
(74) *Attorney, Agent, or Firm* — Robert E. Lyon

(57) ABSTRACT

A renewable power transmission overlay for generating electrical power of regional extent includes three types of generators for generating electrical power from wind, solar radiation and biomass, along with a plurality of region-wide transmission facilities with each region-wide transmission facility having at least one collection facility for collecting electric power from at least one of the generators for generating electrical power. Inter-regional transmission facilities are included which selectively couple the electric power generated by at least two of the types of electrical generators and at least one substation electrical facility is coupled to each of the collection facilities of the region-wide transmission facilities for downloading the electrical power generated to a local electrical transmission grid which, preferably, firms the electric power that is generated, transmitted and downloaded to the local electrical transmission grid.

12 Claims, 2 Drawing Sheets

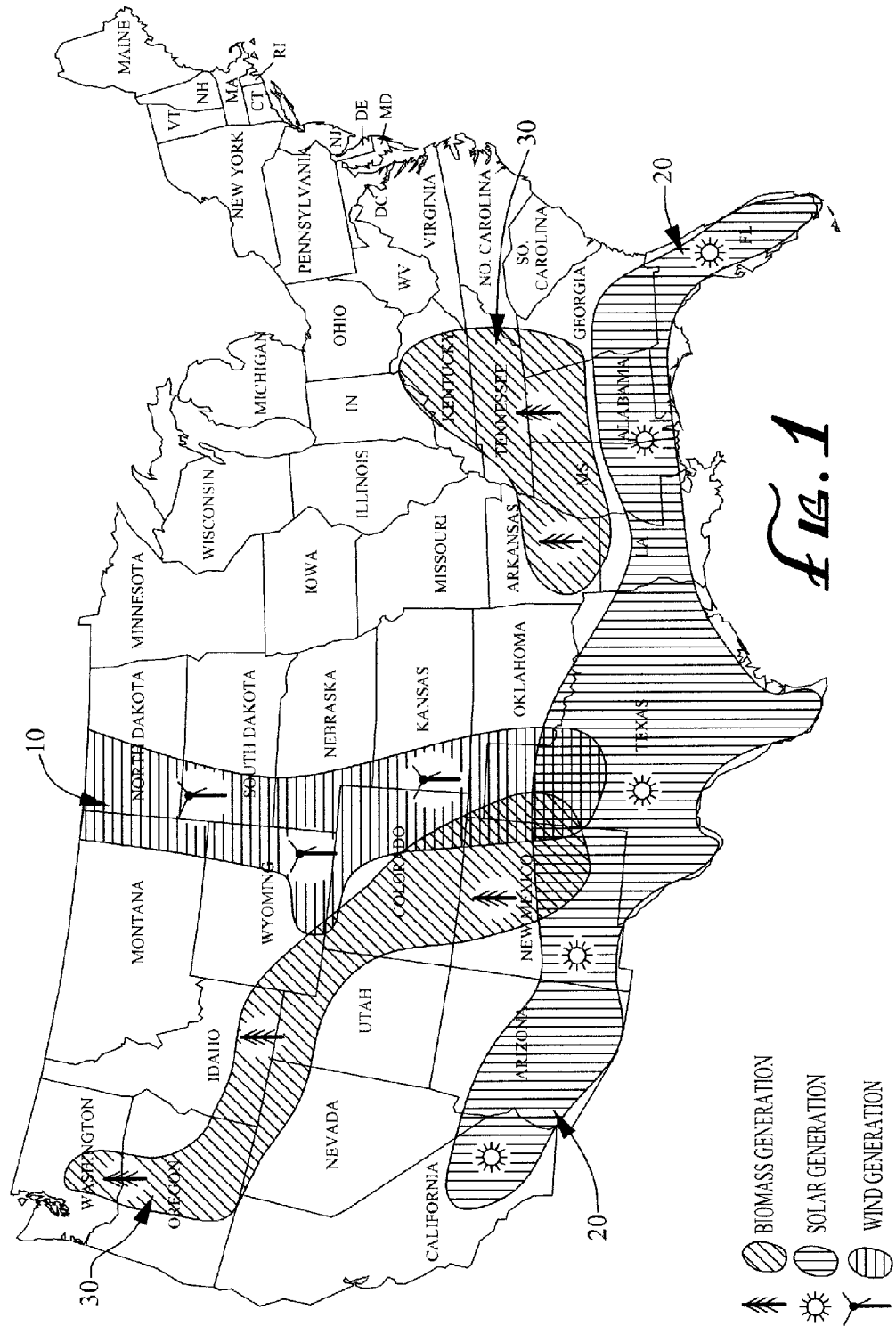

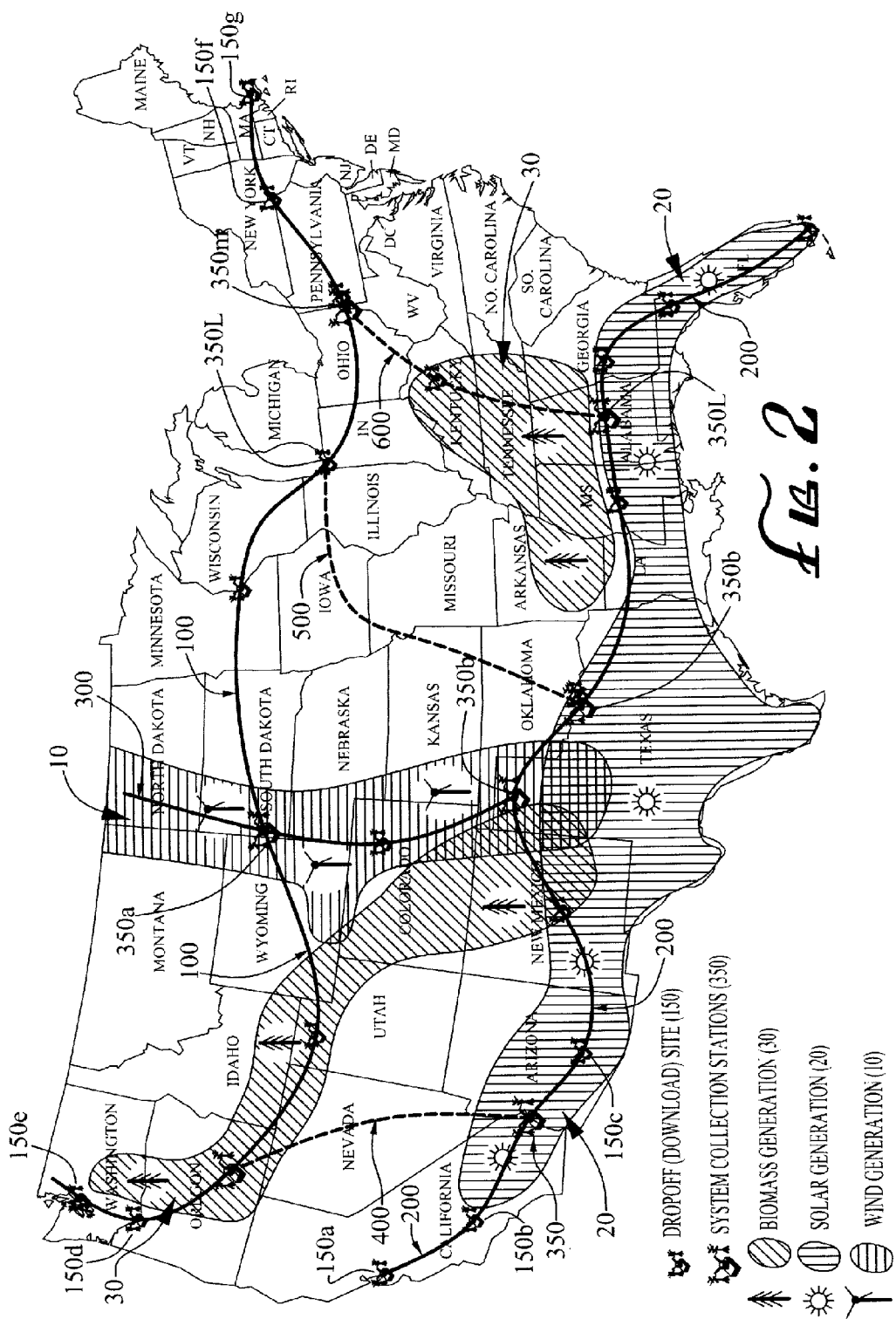

RENEWABLE POWER TRANSMISSION OVERLAY

CROSS-REFERENCE TO PROVISIONAL PATENT APPLICATION

Domestic priority is hereby claimed, pursuant to 35 U.S.C.§119(e), from U.S. Provisional Patent Application Ser. No. 61/020,096, filed Jan. 9, 2008, the entire disclosure of which shall be deemed to be incorporated by reference herein.

BACKGROUND OF THE INVENTION

1. Technical Field of the Invention

The present invention relates, generally, to the provision of a wide area, long distance bulk electric power transmission system.

More particularly, the present invention pertains to, and defines, a transmission system dedicated entirely to the transmission of electric power derived solely from renewable resources and a method of managing such energy on a sustainable basis for delivery to territorially based utilities.

2. Description of the Prior Art

The electricity market in the United States for the year 2005 exceeded four trillion kilowatt hours representing revenues exceeding $300 billion (U.S. dollars.) A substantial majority of that electricity is generated using fossil fuels as the initial source of energy. Coal, s fossil fuel, alone amounts to almost 50% of the total energy source; natural gas provides almost another 19% and nuclear energy also about 19%. Energy from hydroelectric sources is approximately 6.5% and petroleum amounts to about 3%. The contribution from renewable resources amounts to somewhere between 2.5 and 3%.

According to industry sources, statistics show that electricity consumption will increase by more than 50% by 2025. Hence, assuming no changes in the sources of energy are implemented, current sources of energy must be greatly expanded to meet these expected demands. There are serious problems, however, in expanding the use of the current sources of energy. While the world's supply of coal may seem adequate for the time being, both political and environmental pressures seek to reduce the use of coal in the near future. Among the totality of electricity generating plants, coal fired plants are one of the largest of contributors of greenhouse gas emissions, including not only carbon dioxide, sulfur compounds, oxides of nitrogen, other small amounts of toxic elements, etc. Local and regional jurisdictions have already begun putting limits upon the continued use of coal powered plants. Natural gas also produces oxides of carbon and other pollutants, and as a fossil fuel, has limited resources and increasing costs. Nuclear systems, while clean in operation, are generally unpopular, feared as unsafe by many environmentalists and exceedingly expensive. The problem of dealing with nuclear waste has only been partially dealt with. Finally, there has been an historical decline in the growth of hydroelectric power, as water resources become fractionalized by the increasing tension between agricultural and domestic utilization. Hence, legacy coal and other fossil fuel systems will increasingly go off-line and an increasing percentage of replacement power must therefore be found from other sources.

Currently, many states in the United States have legislated renewable portfolio standards (RPS) which mandate that, at some point in time between 2010-2025, an average of 20 to 25% of all electricity be generated using renewable resources at the point of generation on a blended basis, and this percentage is slated to increase in the near future. A federally mandated RPS is being discussed as well. Hence, market demands, environmental desires and government regulations will each drive demand in the electric industry for the development of feasible and sustainable energy generated from renewable resources; the cost of such renewable resources for energy generation continues to be a major concern.

Existing technologies, which employ renewable resources, include wind generation, solar, geothermal and biomass. Each of these technologies (with the possible exception of biomass), as implemented or contemplated today, cannot provide reliable baseload energy, i.e., each such renewable resource not provide electric energy on a constant nor predictable basis, or at economical market prices. In addition to establishing renewable generation facilities, the transmission and delivery of renewable energy is dependent not only upon reliable sources of such energy to provide predictability, but also upon the availability of transmission line capacity. Renewable source generators are often located depending upon the geographic location of their fuel sources, such as wind belts or solar content, which often is not necessarily conveniently located near power lines or cities needing their power, such that new or additional transmission lines must be constructed. Today's underdeveloped and oversubscribed transmission systems have exacerbated the problem of integrating intermittent renewable energy into the grid.

The problem of how to integrate power from intermittent sources (e.g., wind and solar) with the power from sustained sources (e.g., coal or gas) into the transmission grid can best be understood, at least, in part, from the ensuing explanation: A baseload power plant is one that provides a steady flow of power regardless of total power demand by the grid. These plants run at all times through the year except in the case of repairs or scheduled maintenance. Power plants are designated "baseload" based on their low cost of generation, efficiency and safety at set outputs. Baseload power plants do not change production to match power consumption demands. Generally, these plants are sufficiently large to provide a majority of the power used by a grid. As presently used, coal-fired plants are more efficient, as they can run continuously to cover the power baseload required by the grid. They are slow to fire up and to cool down and are therefore generally run at fairly constant output. Each baseload power plant on a grid is allotted a specific amount of the basic power demand to handle. For a typical power system, a rule of thumb is that baseload power is usually 35-40% of the maximum load during the year.

Natural gas and oil powered plants are much faster to start, but have much higher fuel costs. These plants are generally designed to handle peak power demands, since they can be ready to supply power in 30 minutes or less; they are more expensive to operate than coal power plants, primarily due to higher fuel costs.

Hydroelectric power is the quickest to respond to increasing power demands, reaching full power in about two to three minutes. These plants can provide both base load and peak load demands for power at a relatively low cost, but are limited by the amount of water available, as well as other considerations, such as a fractionalized demand created by the tension between municipal and agricultural needs, the need to limit water discharge for flood control reasons and the many issues created by environmentalists.

A special case of hydroelectric power is "pumped storage," wherein excess power from base load plants is used to drive pumps that fill an artificial or natural reservoir, usually at higher elevations. When power demand exceeds the ability to provide energy in "real time," the pumps become generators, feeding the potential energy of the stored water back into the grid, somewhat analogous to a very large storage battery. This same technique has been employed with some wind and/or solar power sources to provide additional power assets available when sun or wind is absent or inadequate.

Certain other types of plants can only be intermittent. Solar and wind power plants generally only produce useful amounts of electricity when conditions are right; their production being totally unrelated to local power demands or needs. When the sun sets or the wind calms, output of solar or wind power plants drop, regardless of the demand for electricity. In addition, the output from wind generators can be quite variable and intermittent, even when some amount of wind is blowing, as wind velocities are seldom constant and changes in velocity and wind direction can vary even within relatively close locales, often resulting in electrical levels that are unacceptable to the grid or at least troublesome to integrate with the output of a baseload generator. This introduces into the discussion the concept known in the power industry as "firming". Essentially, this concept connotes the integration of intermittent and variable power signals from those sources, with other non-intermittent signals and other electronic regimes, to produce a non-variable, sustainable, constant level signal, i.e., one that is "firm".

Additionally, presently proposed regimes to integrate renewable power into the grid with baseload generation are hampered by the allocation of transmission "space" on the grid, and by switching from baseload generation to the wind and/or solar sources when they are producing "properly"- either to substitute for baseload power or just to meet increased or peak demand for power above baseload. One difficulty with this regime is mentioned above: These intermittent sources not only produce "unfirmed" power, but they frequently produce power that is almost totally unrelated to actual demand and are therefore unreliable as sources designed entirely to supply peak demands, inasmuch as these renewable power sources lack the ability to provide baseload.

Several schemes have been considered to store the power from these intermittent sources so as to make their power available when, for example, the sun sets or the wind stops, but all are either too expensive or inefficient, and often both. One of the alternatives for storage is mentioned above: The pumping of water uphill into reservoirs and to use the potential energy to generate power on a more "as-needed" basis. Electrical storage batteries and other chemical conversions into storage media, that can be tapped at more convenient times are much discussed in the literature, but none is satisfactorily efficient. As an example, wind power generation has such variability and lack of reliability that many baseload generators are resistant to use it, and will only switch to such sources during their optimum output conditions. Nevertheless, such wind generators, after being switched off the grid, may yet be producing electrical power but are shunted off the grid in order to more conveniently firm the power and to integrate only their rated outputs with the signals from baseload sources.

Among Newton's Laws of Thermodynamics, the First Law deals with the concept of conservation of energy, i.e., total energy is conserved in all processes; none is either created or destroyed. As better explained by Carnot, however, the First Law lacks the ability to account for the effects of friction and dissipation when energy is used in any way. It was the Second Law that recognized this failure and introduced the concept of entropy. Entropy is an expression that accounts for the irreversibility of thermodynamic systems. Whatever system of transformation is chosen, be it mechanical (pumping water uphill and letting it run back down) or chemical (such as changing electricity into chemical form in a battery, and vice versa), requires work, of either a mechanical, electrical or chemical nature, the results of which are irreversible because of entropy. Energy used in the performance of useful work will always be lost either by the heat of friction or in the chemical reactions of the transformation. The loss is irretrievable. Carnot calculated the extent of these losses, however, the exact quantification of them is not deemed necessary for an appreciation of the significance of the present invention.

The lesson of the Second Law of Thermodynamics is that an important goal toward maximum conservation of generated electrical power would be to make as few trans-formations in the form of that energy as possible.

The aforementioned difficulties of integrating the intermittent outputs of renewable systems into baseload systems results in significant inefficiencies in the utilization of renewable resources. Switching "wind-power" on- and off-line, or trying to store the unused output of wind or solar generation, wastes generation assets. It is known, for example, for a "wind farm" containing, perhaps, ten wind generators, that each of the outputs are variable—or at least not identical— however, when those ten outputs are blended into a common collector, some of those variations can averaged out, and become less troublesome. By the same token, the interconnection of geographically disparate wind farms, each experiencing blended, but still variable power signals, can further serve to average out the variables for a collective signal. The same is the case for other intermittent renewable source generators such as solar, wave or tidal sources, including geothermal.

In view of the aforementioned technical difficulties, plus the fact that nationwide, utility providers lack significant renewable generating assets, and that there is a serious shortfall of transmission facilities, which the present invention seeks to significantly mitigate.

SUMMARY OF THE INVENTION

An object of this invention, therefore, is to provide a regional, or nationwide, transmission overlay system interconnecting a wide variety of renewable sources from disparate geographical locations with dedicated high throughput delivery to territorial utilities.

It is, yet, another, more specific object of this invention to provide a transmission overlay that interconnects renewable resources only, to thereby maximize the integration and firming capabilities of the respective outputs thereof, without having to deal with integration into existing typical baseload HVAC generation or transmission, until the point of actual delivery.

It is still a further object of the present invention to interconnect regionally dispersed sources of solar generation.

The foregoing and related objects are accomplished by the present invention, which provides an integrated regional transmission system that accesses, integrates and firms renewable resources from disparate areas within a predetermined geographical area, and which includes the provision of a renewable power overlay that provides the capability of "following the sun," as available from region to region. Specifically, the renewable power transmission overlay for generating electrical power of the present invention includes three types of generators that generate electrical power from wind, solar radiation and biomass, along with a plurality of region-wide transmission facilities with each region-wide transmission facility having at least one collection facility for collecting electric power from at least one of the generators for generating electrical power. Interregional transmission facilities are included which selectively couple the electric power generated by at least two of the types of electrical generators, and at least one substation electrical facility is coupled to each of the collection facilities of the region-wide transmission facilities for downloading the electrical power generated to a local electrical transmission grid which, preferably, firms the electric power that is generated, transmitted and down-loaded to the local electrical transmission grid.

By interconnecting solar generation facilities, for example, from Florida to California, the contribution to the integrated system from solar sources can be increased by a factor of three to four hours per day. At winter solstice, by way of example, both Miami, Florida and Los Angeles, Calif. provide approximately 9½ to 10½ hours of solar assets. At the time of the summer solstice both Miami, Florida and Los Angeles, Calif. provide 14½ to 15 hours of solar assets per day. By interconnecting Florida and California, under a "follow the sun" concept, solar generation assets which can be contributed to the integrated system can run between 13½ hours/day to as much as 17-18 hours/day.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawings, wherein similar reference numerals and symbols denote similar features throughout the several views:

FIG. 1 presents a representation of the continental United States, wherein cross-hatched areas indicate locations of renewable resources with the legend thereof indicating the locations having a good supply of biomass generation resources, solar generation resources and wind generation resources; and, FIG. 2 presents a conceptual representation of a regional transmission grid overlay, accessing the identified resources, which according to a preferred embodiment of the present invention, provides an integrated regional transmission system that accesses, integrates and firms renewable resources from disparate areas within the region.

DETAILED DESCRIPTION OF THE DRAWING FIGURES AND PREFERRED EMBODIMENTS

Turning now, in detail, to an analysis of the drawing figures, FIG. 1 shows an area cross-hatched with horizontal lines comprising the area falling generally along the eastern slope of the Rocky Mountains range. This zone comprises one of the largest zones of substantially continuous wind assets in the United States—Wind Belt 10.

The areas cross-hatched with diagonal lines represent areas of the region having substantial woody biomass assets—Biomass Belt 30. There are also other areas of the region having valuable accessible biomass resources, such as more northerly Rocky Mountains zones, but for purposes of this RPO, the biomass areas are chosen for more reasonable access to population areas and to other renewable resource areas. There are also bovine waste bio-assets adjacent the biomass marked areas, such as in the Texas Panhandle area, for example, which it is an object of this invention to access.

Similarly, the areas marked with vertical hatching depict the Sun-Belt 20 extending across the southern region from California to Florida, which can provide a "follow the sun" technology.

As will become more specifically apparent from the detailed discussions regarding FIG. 2, it is the over-arching concept of the invention to locate the various power generation types (wind, solar, bio-mass) in those specific areas identified as having the richest resource assets relevant to each power generation type; also taking into account reasonable geographic relationships to power-demand areas. While there are some instances of geographic areas where resource assets may overlap, in the greater sense, they mostly do not. Hence, for example, it makes sense to place the wind powered generators in wind belt 10, the area most rich in wind asset resources. Likewise, sun belt 20 has the richest concentration of solar asset resources; and the same for the bio-mass belt 30—place the bio-mass powered generators where there is the richest concentration of bio-mass asset resources.

Turning, next, to FIG. 2, this drawing figure presents a map of the continental United States upon which there are superimposed two proposed major transmission pathways representing transmission lines extending east and west across the region, here the U.S. continent. The upper transmission line 100 extends from the west coast of the region of the United States, and connects Seattle, Wash. through major cities across the upper northern and Midwest states into the northeast and terminating in New York City and northward. Likewise, lower transmission pathway 200 extends from the Pacific coast, commencing, e.g., in San Francisco, Calif. and extending across the southwest, Midwestern and southeastern states, terminating in Florida. The precise locations of transmission lines 100 and 200 need not necessarily be exact, however, the point is that each transmission line extends through those biomass, solar and/or wind rich sites 10, 20 and/or 30 so as to most easily access such generation assets. As mentioned hereinabove, transmission lines 100 and 200 have as their locus those areas having a plenitude of renewable generation assets, either solar, wind, or biomass; or combinations thereof. Situated at numerous locations along transmission pathways 100 and 200 as they pass through renewable rich resource areas will have connected thereto a plurality of generation stations depending upon the location and richness of the respective renewable assets along those pathways where such renewable assets exist in high concentrations.

The small icons 150 represent drop-off points or point-of-presence locations along transmission lines 100 and 200 which will be located at markets for transmitted energy. For example, along transmission line 200, it will be seen that drop-off point 150*a* is located approximately in the area of San Francisco; drop-off point 150*b* is located in central California to access the various utilities serving Southern California and another drop-off point 150*c* is seen located in approximately the Phoenix, Ariz. area. It will similarly be noted that along transmission line 200 numerous drop-off points 150 are located near metropolitan areas where large markets exist for electric power; the same is true for drop-off points 150 located along transmission pathway 100. For example, it will be seen that drop-off point 150*d* is located in approximately the Portland, Oreg. area, 150*e* is located in approximately of the Seattle-Tacoma area of Washington. Similarly drop-off points 150*f* and 150*g* are located along transmission path 100 providing point-of-presence, drop-off facilities in the New York, Pennsylvania, Massachusetts and Connecticut areas.

Obviously the precise locations of drop-off points along both transmission paths 100 and 200 are representative, or approximate, and the exact locations will be determined by the market interest in those states to which transmission pathways 100 and 200 run, and in right-of-way considerations. In addition to transmission pathways 100 and 200, a North-South transmission pathway 300 is established in wind belt 10 extending from the Panhandle area of Texas through wind belt 10, up to about Wyoming and North Dakota. The large icons 350 stationed along North-South transmission pathway 300 represent interregional collection facilities. For example, collection facility 350a shows an interconnect between transmission pathway 100 and transmission pathway 300. Similarly, collection station 350b located in the Panhandle of Texas connects to transmission pathway 300 and the southern transmission pathway 200 in an area of Texas, Oklahoma and New Mexico which are areas with a plenitude of both solar, wind and biomass.

Additional North-South extending interconnection lines 400, 500 and 600 represent sub-transmission paths interconnecting the East-West lines with collection stations 350 for providing more direct connections, for example, between transmission path 100 in Oregon and transmission path 200 located near the California-Arizona border. Intermediate sub-transmission line 400 thereby provides a more direct interconnect between biomass generated energy in biomass belt 30 and solar asset area 20. North-South intermediate sub-transmission line 500 serves to interconnect renewable power generated assets in the Texas-Oklahoma area between collection station 350c with transmission path 100 to the Chicago area with a collection point/station 350i. Hence, intermediate sub-transmission path 500 provides intermediate connection facilities between solar mass generated assets in the Sunbelt to major metropolitan areas in the central portion of the region to augment biomass generated and wind mass generated assets obtained along transmission pathway 100 with solar generated assets from Sunbelt 20.

North-South sub-transmission line pathway 600 serves to interconnect at collection station 3501 and collection station 350m, thereby providing intermediate sub-transmission pathways from Sunbelt 20 in the Alabama area, for example, through the Midwest biomass belt 30 to interconnect sun and biomass assets with the wind and biomass energy being conducted along northern transmission pathway 100 to provide that renewable energy, not only along sub-transmission path 600, but ultimately connecting to major markets in the Ohio and Pennsylvania areas.

The location of the major transmission pathways 100 and 200 represent only the concept of the present invention. It is to be understood that the exact sites for them and the sub-transmission pathways is presently only conceptual in nature, to represent the objects of the present invention. The precise sites of each of the transmission paths will obviously depend upon the location of adequate rights of way (ROW.) Likewise, the location of the collection stations 350 and the drop-off sites 150 is merely illustrative at present and conceptual in nature; the exact sites and location of the same will depend upon the rights of way as well as the precise exact locations of the wind and solar and biomass assets.

FIGS. 1 and 2 suggest that the present invention contemplates the need for approximately 12,000 miles of ROW. ROW's, for example, for transmission pathway 200 basically suggests, at least in part, following the rights of way of one or more existing railroad lines, for example, part of the way through the southwestern portion of the United States, as well as certain existing transcontinental highways. Likewise, transmission pathway 100 is situated roughly approximating some of the northwest and northeast railway and interstate highway rights-of-way. It is understood that there exist somewhere in the nature of 3,000,000 miles of available rights-of-way, which can be shared with the renewable power overlay system contemplated by the present invention. Modern transmission techniques such as HVDC, which can be either above-ground or buried below ground in some areas can utilize very much narrower rights-of-way than existing HVAC transmission pathways, thereby maximizing the use of presently existing rights-of-way.

At collection stations 350, computational switching systems, in what are generally known in the trade as "substations," integrate the intermittent and variable outputs from wind sources with the relatively stable-state signals from biomass generators, to produce a firmed power source. This maximizes wind-sourced assets by reducing off-wind-wasted power, and by firming, increases total usage of wind-generated power. Similarly, collection station substations interconnect solar and biomass generation sources firm the time-of-day variability and atmospherically induced intermittency of solar power by computational switching systems, which firms intermittent solar power by time-integration with steady-state biomass generated power. The symbiotic calculus of the wind-sourced power and the solar-sourced power with biomass generation wherein much of the inherent intermittency of which has obtained some "firmation" by integration with other disparately located wind and/or solar sourced generation facilities, produces a summation generation capability much as if there is a virtual, region-wide power generation system. This virtual generator provides the power overlay (RPO) transmission system the capability of delivering dispatchable, clean power region-wide, from geographically remote, asset-rich location sites, collectively, to population/industrial-rich sites where energy demands are highest.

The substations at collection stations 350 and download sites 150 may both provide A to D and D to A conversion system capabilities. Ideally, AC power from typical wind generators and some categories of solar-sourced generators will be converted to DC and integrated with biomass power to provide firmed DC power for optimal long-range transmission over the power overlay (RPO.) Drop-off sites 150 will typically incorporate high level D-A conversion facilities to accommodate local HVAC transmission grids. In doing so, in this manner, efficiencies are gained by transmitting HVDC power on a long-range basis, and converting to HVAC only for local use. By firming, the intermittencies of duty cycles, phase relations, voltage and current levels, impedance-induced variables, and the like, all of which are inherent in any long-range HVAC transmission, and are likely more exacerbated in the described power transmission system, because it integrates power generated from different types of sources. Maximizing the power factor as described, diminishes power losses inherent in such mismatches, and the overall efficiency of a long-range, region-wide transmission and virtual generation system is optimized.

The use of HVDC, which provides for time insensitive introduction of intermittent resources, nimble load tracking biomass systems and the combination of computerized and network load and generation tracking allows the RPO to become a virtual generating system, allowing for electrons to be generated thousands of miles away and then synchronized locally with the delivery point's HVAC networks.

Transmission pathway 200 allows for "follow the sun" peaking power for areas that during peak cooling days require additional power, allowing the power to literally follow the sun from east to west coast with peak power, and no system control or timing difficulties. This cannot be accomplished in today's power grid architecture. The interconnection between California and Florida along transmission pathway 200 provides for increased access to solar generation assets. By interconnecting solar generating assets across the Sunbelt, increased utilization of solar generating facilities accrues. For example, at the winter solstice, both Miami and Los Angeles provide approximately 10½ hours of sunshine, however, by interconnecting Miami and Los Angeles, for example, the total exposure to sunshine for the RPO system can be increased to 13½ to 14 hours of sunlight. Similarly, during the summer solstice, Miami has approximately 14½ hours of sunshine and Los Angeles approximately 15 hours of sunshine, however, by interconnecting Florida and California in the suggested manner, the 14½ to 15 hours of sunlight in each state can provide 17 to 18 hours of sunlight in the "follow the sun" conceptual system.

While only several embodiments of the present invention have been shown and described, it will be obvious to those skilled in the art that many modifications may be made to the present invention without departing from the spirit and scope thereof.

What is claimed is:

1. An electric power transmission system of regional geographic extent, comprising:
   means for generating electric power via wind located in at least one geographic area having rich wind asset resources;
   means for generating electric power via solar radiation located in at least one geographic area having rich solar radiation asset resources;
   means for generating electric power via biomass located in at least one geographic area having rich biomass asset resources;
   a plurality of region-wide transmission facilities with each region-wide transmission facility of said plurality of region-wide transmission facilities having at least one collection facility for collecting electric power from at least one of said means for generating electric power via wind, said means for generating electric power via solar radiation and said means for generating electric power via biomass;
   inter-regional transmission facilities having means for selectively coupling the electric power generated by at least two of said means for generating electric power via wind, said means for generating electric power via solar radiation and said means for generating electric power via biomass at said at least one collection facility; and,
   at least one substation electrical facility coupled to each said collection facility of each said region-wide transmission facility for providing means for downloading the electrical power generated to a local electrical transmission grid.

2. The electrical power transmission system of regional geographic extent according to claim 1, wherein at least one said collection facility of each said region-wide transmission facility includes means for firming the electrical power generated by said means for generating electric power via wind, said means for generating electric power via solar radiation and said means for generating electric power via biomass.

3. The electrical power transmission system of regional geographic extent according to claim 1, wherein said means for downloading the electric power generated to a local electrical transmission grid includes means for converting DC electrical power to AC electrical power.

4. The electrical power transmission system of regional geographic extent according to claim 1, wherein said means for downloading the electrical power generated to a local electrical transmission grid includes means for firming the electrical power generated by said means for generating electric power via wind, said means for generating electric power via solar radiation and said means for generating electric power via biomass.

5. The electrical power transmission system of regional geographic extent according to claim 1, wherein at least one said collection facility of each said region-wide transmission facility includes means for enhancing a power factor of the electrical power that is generated and being transmitted by each said region-wide transmission facility.

6. The electrical power transmission system of regional geographic extent according to claim 1, wherein said means for downloading the electrical power generated to a local electrical transmission grid includes means for enhancing a power factor of the electrical power that is generated and being transmitted by each said region-wide transmission facility.

7. An electrical power transmission system of regional geographic extent, comprising:
   means for coupling together a plurality of means for generating electric power via wind located in at least one geographic area having rich wind asset resources;
   means for coupling together a plurality of means for generating electric power via solar radiation located in at least one geographic area having rich solar radiation asset resources;
   means for coupling together a plurality of means for generating electric power via biomass located in at least one geographic area having rich biomass asset asset resources;
   a plurality of region-wide transmission facilities with each region-wide transmission facility of said plurality of region-wide transmission facilities having at least one collection facility for collecting electric power from at least one of said means for generating electric power via wind, said means for generating electric power via solar radiation and said means for generating electric power via biomass;
   inter-regional transmission facilities having means for selectively interconnecting the means coupling the electric power generated by at least two of said means for generating electric power via wind, said means for generating electric power via solar radiation and said means for generating electric power via biomass at said at least one collection facility; and,
   at least one substation electrical facility coupled to each said collection facility of each said region-wide transmission facility for providing means for downloading the electrical power from said inter-regional transmission facilities to a local electrical transmission grid.

8. The electrical power transmission system of regional geographic extent according to claim 7, wherein at least one said collection facility of each said region-wide transmission facility includes means for firming the electrical power generated by said means for generating electric power via wind, said means for generating electric power via solar radiation and said means for generating electric power via biomass.

9. The electrical power transmission system of regional geographic extent according to claim 7, wherein said means for downloading the electric power generated to a local electrical transmission grid includes means for converting DC electrical power to AC electrical power.

10. The electrical power transmission system of regional geographic extent according to claim 7, wherein said means for downloading the electrical power generated to a local electrical transmission grid includes means for firming the electrical power generated by said means for generating electric power via wind, said means for generating electric power via solar radiation and said means for generating electric power via biomass.

11. The electrical power transmission system of regional geographic extent according to claim 7, wherein at least one said collection facility of each said region-wide transmission facility includes means for enhancing a power factor of the electrical power that is generated and being transmitted by each said region-wide transmission facility.

12. The electrical power transmission system of regional geographic extent according to claim 7, wherein said means for downloading the electrical power generated to a local electrical transmission grid includes means for enhancing a power factor of the electrical power that is generated and being transmitted by each said region-wide transmission facility.

\* \* \* \* \*